US005088691A

United States Patent [19]

Naber et al.

[11] Patent Number: 5,088,691

[45] Date of Patent: Feb. 18, 1992

[54] HYDRAULIC APPARATUS INCLUDING A HYDRAULIC FLUID FLOW CONTROL CARTRIDGE

[75] Inventors: Charles E. Naber; James B. Ballard, both of Waukesha, Wis.

[73] Assignee: Hein-Werner Corporation, Waukesha, Wis.

[21] Appl. No.: 104,333

[22] Filed: Oct. 2, 1987

Related U.S. Application Data

[63] Continuation of Ser. No. 872,200, Jun. 6, 1986, abandoned.

[51] Int. Cl.[5] ........ B60P 1/48

[52] U.S. Cl. ........ 254/8 R; 254/124

[58] Field of Search ........ 254/8 B, 124; 417/311, 417/313, 571, 546, 307; 60/477, 452

[56] References Cited

U.S. PATENT DOCUMENTS 1,147,286 10/1912 Welch .
1,212,757 1/1917 Freese ........ 60/482
1,904,115 4/1933 Bacon ........ 60/482
3,081,007 3/1963 Lightburn ........ 60/482
3,464,204 9/1969 Rudkin ........ 60/482
3,797,675 3/1974 Moore ........ 254/8 B
4,396,033 8/1983 Narumi et al. ........ 417/307

*Primary Examiner*—J. J. Hartman
*Attorney, Agent, or Firm*—Michael, Best & Friedrich

[57] ABSTRACT

Hydraulic apparatus including a hydraulic fluid flow control cartridge for controlling hydraulic fluid flow between a hydraulic fluid reservoir and a hydraulic fluid pump and between the hydraulic fluid pump and the hydraulic cylinder, and for permitting relief of hydraulic fluid from the pump to the reservoir in the event the hydraulic fluid pressure in the pump exceeds a selected pressure.

23 Claims, 2 Drawing Sheets

HYDRAULIC APPARATUS INCLUDING A HYDRAULIC FLUID FLOW CONTROL CARTRIDGE

This is a continuation of co-pending application Ser. No. 872,200 filed on June 6, 1986, now abandoned.

FIELD OF THE INVENTION

The present invention is directed to manually operable hydraulic cylinders used in a number of applications such as in portable hydraulic cranes, and more particularly to hydraulic fluid flow control assemblies used with such hydraulic cylinders.

BACKGROUND OF THE INVENTION

In many applications of hydraulic pump assemblies it is important that means be provided to limit the fluid pressure generated by the pump to prevent damage to the hydraulic ram cylinders connected to the hydraulic pump or damage to other structural components supported by the hydraulic rams. For example, in the case of a conventional bottle jack, it is important that the hydraulic fluid pressure supplied by the hydraulic fluid pump to the jack ram cylinder not exceed the capacity of the ram cylinder. In the case of a portable hydraulic crane of the type including a boom supported by a hydraulic ram it is important that the boom should not be used to lift objects which will overload the crane and that the hydraulic ram not be permitted to apply an upward force on the boom which will structually overload the crane. In some prior art portable cranes the base of the hydraulic assembly is provided with a high pressure fluid relief passage extending from the hydraulic pump to the fluid reservoir to relieve fluid from the pump to the reservoir in the event the fluid pressure generated in the pump exceeds a selected maximum pressure. The fluid relief passage in the base includes a valve seat, and a ball held in engagement with the valve seat by a compression spring. The compression spring applies sufficient force on the ball that the ball engages the valve seat and precludes fluid flow unless the fluid pressure generated by the pump reaches a maximum selected value.

SUMMARY OF THE INVENTION

The present invention includes an improved means for controlling hydraulic fluid flow between a hydraulic fluid reservoir and a hydraulic fluid pump and between the hydraulic fluid pump and the hydraulic ram cylinder.

More specifically, the invention includes a fluid flow control cartridge for use in connection with a hydraulic fluid pumping assembly and for providing for control of hydraulic fluid flow from a reservoir to a hydraulic fluid pump, control of hydraulic fluid flow from the hydraulic fluid pump to a hydraulic ram, and relief of hydraulic fluid from the hydraulic fluid pump to the hydraulic fluid reservoir in the event the hydraulic fluid pressure generated by the hydraulic fluid pump is greater than a predetermined or selected maximum pressure.

In one embodiment of the invention a hydraulic pump is operably connected by a first fluid passage to a reservoir and operably connected by a second fluid passage to a ram cylinder, the hydraulic fluid pump including a pump cylinder and a piston housed in the pump cylinder for reciprocal movement. Means are also provided for selectively causing reciprocating movement of the pump piston. A hydraulic fluid control cartridge is also provided, the hydraulic fluid control cartridge including means for controlling the flow of hydraulic fluid from the hydraulic fluid reservoir to the pump, means for controlling hydraulic fluid flow from the hydraulic fluid pump to the ram cylinder, and high pressure relief means for providing for flow of hydraulic fluid from the hydraulic fluid pump to the reservoir when the hydraulic fluid pressure in the pump exceeds a predetermined hydraulic fluid pressure.

In one embodiment of the invention the hydraulic pump includes a base having a bore with one end housing the pump cylinder, and an opposite end terminating in a fluid passage extending between the pump cylinder and the ram cylinder. The hydraulic cartridge is housed in the bore, and the fluid passage from the hydraulic fluid reservoir to the pump intersects the bore adjacent the hydraulic cartridge.

In a preferred form of the invention the cartridge includes a body having a first cartridge passage including a first check valve, the first check valve preventing fluid flow from the pump cylinder to the hydraulic fluid reservoir. The body also includes a second cartridge passage having a second check valve preventing fluid flow from the cylinder to the fluid pump, and a third hydraulic fluid passage communicating with the passage from the reservoir to the pump cylinder, the third passage including a valve seat, a ball selectively engageable with the valve seat, and spring means for forcing the ball into engagement with the valve seat. The spring permits the ball to move away from the valve seat when the hydraulic fluid pressure in the pump cylinder exceeds a selected value.

One of the principal features of the invention is that the hydraulic fluid flow control cartridge contains all of the valves used to control flow of hydraulic fluid from the reservoir to the pump and from the pump to the hydraulic cylinder, and including the pressure relief valve operably connected to the reservoir to vent hydraulic fluid pressure to the reservoir in the event hydraulic fluid pressure generated by the pump becomes excessive.

The control cartridge is also conveniently mounted in a bore provided in the base of the hydraulic unit, and the use of the control cartridge eliminates the need for the provision of valve seats and check valves to be provided in the body of the hydraulic unit base. The control cartridge eliminates the need for separate pressure relief valves to be provided in the hydraulic base. Accordingly, manufacture of the base requires less machining of passages and valve seats in the base. The provision of the control cartridge including the high pressure relief valve also permits more economical assembly of the product.

One of the advantages of the use of the hydraulic fluid flow control cartridge is that the bores provided in the cartridge and housing the check valves and the fluid pressure relief valve are relatively small and are conveniently machined in the cartridge, and only a single workpiece is machined. If the bores and valve seats are individually machined into the hydraulic unit base, substantially more machining and tooling is required.

Additionally, since the control cartridge is relatively small and because the bores in the cartridge can comprise three generally parallel axially extending bores and a single radially extending bore, the control cartridge can be machined on automatic machine centers.

A further advantage realized from machining a small work piece is that less scrap is generated. Additionally, the machining of the larger workpiece, such as the unit base, can be done with less sophisticated machines since the base will not include machined valve seats.

Various other features and advantages of the invention will be apparent by reference to the following description of a preferred embodiment, from the drawings and from the claims.

DESCRIPTION OF A PREFERRED EMBODIMENT

Figure 1:
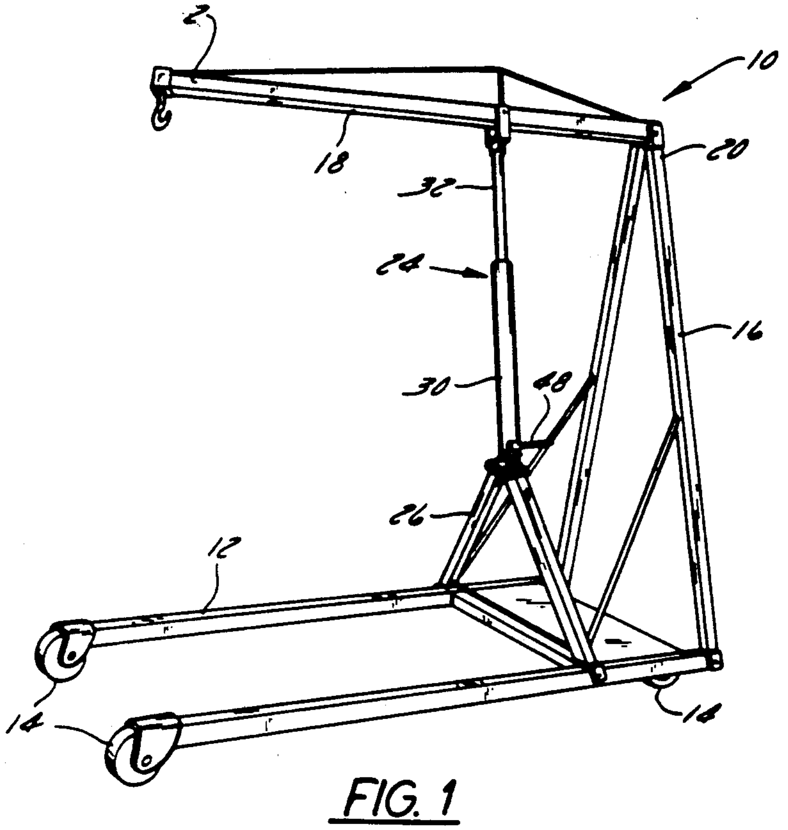
FIG. 1 is a perspective view of a portable hydraulic crane embodying the present invention.

Illustrated in FIG. 1 is a portable crane 10 including a hydraulic fluid pump assembly embodying the invention. The portable crane 10 includes a base 12 supported for movement by a plurality of wheels 14, and an upwardly extending support structure 16 supported by the base 12. A boom 18 has one end pivotally joined to the upper end 20 of the support structure 16 and includes a free end 22 for use in lifting a product to be supported by the crane.

A hydraulic unit assembly 24 has one end supported by a frame 26, the frame 26 in turn being supported by the base 12. An opposite end of the hydraulic unit assembly 24 is pivotally connected to the boom 18 intermediate the opposite ends of the boom. In the illustrated assembly the hydraulic unit assembly 24 includes a hydraulic ram cylinder 30 supported at its lower end by the frame 26, and includes a ram 32 having an upper end pivotally connected to the boom 18.

Figure 2:
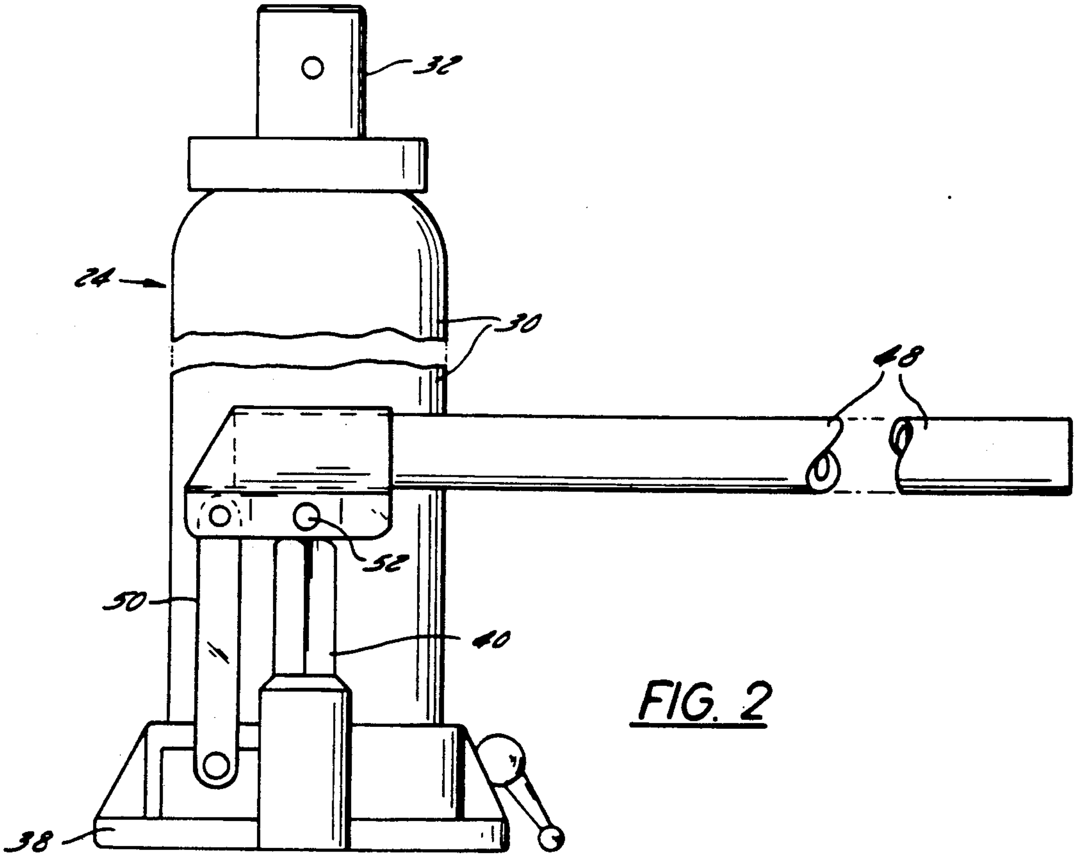
FIG. 2 is an enlarged illustration of a manual hydraulic fluid pump included in the portable hydraulic crane illustrated in FIG. 1.
Figure 3:
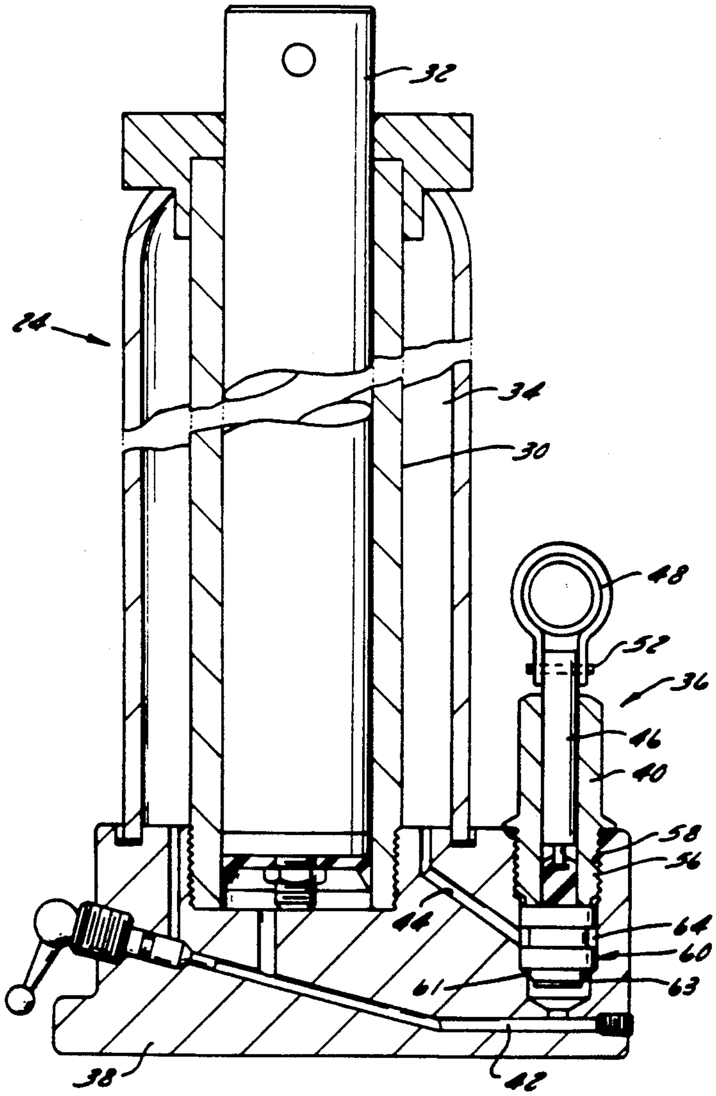
FIG. 3 is an enlarged cross section view of apparatus shown in FIG. 2.

The hydraulic unit assembly 24 also includes a hydraulic fluid reservoir 34 (FIG. 3) and a hydraulic fluid pump 36 carried by a base structure 38 of the hydraulic unit assembly 24. More specifically, as shown in FIGS. 2 and 3, the base 38 supports a pump cylinder 40, and the base includes a high pressure hydraulic fluid port or passage 42 intended to provide fluid communication between the pump cylinder 40 and the ram cylinder 30. The base 38 also includes a low pressure hydraulic fluid passage 44 between the hydraulic fluid reservoir 34 and the pump cylinder 40.

A piston 46 is housed in the pump cylinder 40, and a pump handle or lever 48 is provided for causing manual reciprocal movement of the pump piston 46 in the pump cylinder 40. The pump handle is pivotally supported by a support bracket 50 and is pivotably connected to the pump piston 46 by a pin 52 such that manual movement of the pump handle 48 will cause reciprocal movement of the pump piston 46 in the pump cylinder 40.

In the illustrated arrangement, the lower end 56 of the pump cylinder 40 is threaded into bore 58 provided in the base 38 such that the lower end 56 of the pump cylinder is fixed in the bore.

Figure 5:
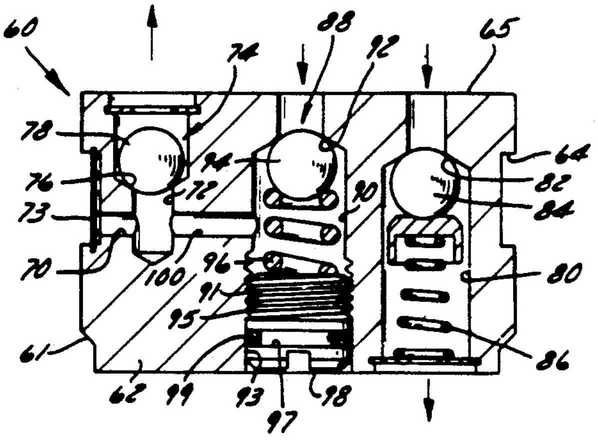
FIG. 5 is an enlarged cross section view of the hydraulic cartridge illustrated in FIGS. 3 and 4. Before describing a preferred embodiment of the invention, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.
Figure 4:
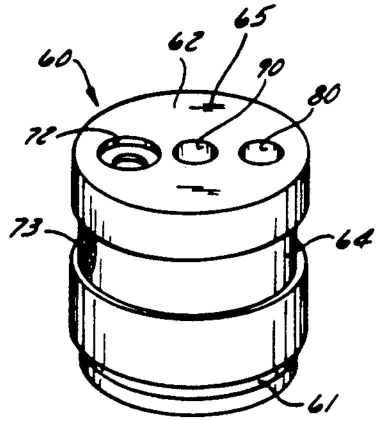
FIG. 4 is a perspective view of the hydraulic cartridge illustrated in FIG. 3.

Means are also provided for controlling the flow of hydraulic fluid from the hydraulic fluid reservoir 34 to the pump cylinder 40, flow of hydraulic fluid from the pump cylinder 40 to the ram cylinder 30 and flow of hydraulic fluid from the pump cylinder 40 to the reservoir 34 in the event the hydraulic fluid pressure generated in the pump cylinder 40 exceeds a selected pressure. The means for controlling hydraulic fluid flow comprises a hydraulic fluid flow control cartridge 60 housed in a portion of the bore 58 below the pump cylinder 56. The hydraulic cartridge 60 is shown more specifically in FIGS. 4 and 5 and includes a generally cylindrical body 62 housed in the bore 58, and including a circumferential groove 64 surrounding the periphery of the body 62 and intermediate the opposite ends of the body. The lower end of the cartridge 60 includes a shoulder 61 forced into fluid tight engagement with a complementary shoulder 63 of the bore 58, and the lower end of the pump cylinder 40 engages the flat upper surface 65 of the cartridge 60 to force the shoulder 61 into engagement with shoulder 63 and to provide a fluid tight seal between the pump cylinder 40 and the cartridge 60.

As best illustrated in FIG. 3, the circumferential groove 64 of the hydraulic cartridge body 62 communicates with the passage or port 44 from the hydraulic fluid reservoir 34. Fluid flow from the passage 44 to the chamber of the pump cylinder 40 is provided by a radially extending passage 70 and an axially extending passage 72. A filter screen 73 is also provided to prevent contaminants from entering passage 70. The passage 72 also includes a check valve 74 precluding fluid flow from the pump cylinder 40 to the reservoir 34 but permitting free flow of fluid from the reservoir 34 to the pump cylinder 40. The check valve 74 includes a valve seat 76 and a ball 78 selectively engageable with the valve seat 76.

The hydraulic cartridge 60 also includes a passage 80 extending axially through the cartridge body 62 and providing for fluid flow from the pump cylinder 40 to the high pressure port 42. The passage 80 includes a check valve comprised of a valve seat 82 and a ball 84 engageable with the valve seat 82 to prevent reverse flow from the high pressure port 42 to the pump cylinder. A light compression spring 86 is provided to maintain the ball 84 in position against the valve seat 82.

The hydraulic cartridge 60 also includes a high pressure overload valve 88 for discharging hydraulic fluid to the reservoir 34 when the pressure in the pump cylinder 40 exceeds a selected value. In the illustrated arrangement a bore 90 extends axially through the cartridge body 62, the bore 90 including a valve seat 92. A ball 94 seats against the valve seat 92. The ball 94 is normally maintained in engagement with the valve seat 92 by a compression spring 96. The compression spring 96 provides sufficient force on the ball 94 that the ball will move away from the valve seat 92 only after the hydraulic fluid pressure in the pump cylinder 40 reaches a selected maximum pressure. In the illustrated arrangement the compression spring 96 is held in place against the ball 94 by an adjustable plug 98. The adjustable plug 98 is threaded into a threaded portion of the bore 90 and includes a lower end 97 including a seal 99 adapted to form a fluid tight seal with the smooth surface portion 93 of the bore 90. An upper end 95 of the plug 98 is threaded into a threaded portion 91 of the bore 90. A transverse or radially extending bore 100 intersects the axially extending bore 90 and provides communication with the passage 70 whereby hydraulic fluid can be vented past the relief valve 88 through passage 44 to the reservoir 34.

While in the illustrated arrangement the cartridge includes a one piece body, in other arrangements the flow control cartridge could be comprised of a plurality of cartridge bodies housed in the bore 58 or housed in a plurality of bores each communicating with the pump cylinder.

Various features of the invention are set forth in the following claims.

We claim:

1. A hydraulic fluid flow control cartridge for use with a hydraulic fluid pump and for controlling flow of hydraulic fluid between a reservoir and the hydraulic fluid pump and from the hydraulic fluid pump to a fluid pressure chamber, the hydraulic fluid pump including a pump bore, a pump cylinder housed in a portion of the pump bore, the pump cylinder housing a reciprocable pump piston, and the hydraulic fluid flow control cartridge comprising:

- a cartridge body adapted to be housed in a second portion of the pump bore adjacent the pump cylinder and separable from the pump cylinder, the cartridge body including
- a first cartridge passage having a first check valve means for selectively providing for fluid flow from the hydraulic fluid reservoir to the hydraulic fluid pump, said first check valve means including means for preventing fluid flow from said hydraulic fluid pump to the reservoir,
- a second cartridge passage having second check valve means for selectively providing for hydraulic fluid flow from said hydraulic fluid pump to said fluid pressure chamber but preventing fluid flow from said fluid pressure chamber to said hydraulic fluid pump, and
- means responsive to the hydraulic fluid pressure in the pump for automatically causing hydraulic fluid in the hydraulic fluid pump to be vented to the reservoir whenever the hydraulic fluid pressure in the pump exceeds a selected maximum hydraulic fluid pressure, the means for selectively venting including a third cartridge passage.

2. A hydraulic fluid flow control cartridge as set forth in claim 1 wherein said means for automatically causing hydraulic fluid in the hydraulic fluid pump to be vented includes a valve seat in said third passage, a valve member engageable with said valve seat and movable away from said valve seat to permit fluid flow from said pump to said reservoir, and spring means engageable with the valve means and resiliently biasing the valve means against the valve seat.

3. A hydraulic fluid flow control cartridge as set forth in claim 1 wherein said means for automatically causing hydraulic fluid in the hydraulic fluid pump to be vented provides for venting of fluid pressure from the pump while maintaining fluid pressure in the fluid pressure chamber.

4. A hydraulic fluid flow control cartridge as set forth in claim 1 wherein said cartridge comprises a cylindrical body having a generally cylindrical periphery and having a longitudinal axis, and wherein each of said cartridge passages has a longitudinal axis, and wherein the respective longitudinal axes of said cartridge passages are spaced apart with respect to one another and are generally parallel to said longitudinal axis of the cylindrical body.

5. A hydraulic fluid flow control cartridge as set forth in claim 4 and further including a transverse passage extending from said third cartridge passage to said generally cylindrical periphery, said transverse passage providing fluid communication between said third cartridge passage and the reservoir.

6. A hydraulic fluid flow control cartridge as set forth in claim 5 wherein said transverse passage intersects said first cartridge passage between said first check valve and the reservoir.

7. A hydraulic fluid pump assembly comprising:

- a pump base including at least one bore,
- a pump cylinder adapted to be connected in fluid communication by a first fluid passage to a hydraulic fluid reservoir, and adapted to be connected by a second fluid passage to a fluid pressure chamber, the pump cylinder being in communication with the bore of the pump base,
- a pump piston housed in the pump cylinder and reciprocably movable to cause fluid to be pumped from the reservoir to the fluid pressure chamber, and
- hydraulic fluid control cartridge means housed in the bore, the hydraulic fluid control cartridge means including a cartridge body removably housed in the bore and separable from the pump cylinder, the hydraulic fluid control cartridge means including means for controlling the flow of hydraulic fluid from the hydraulic fluid reservoir to the pump cylinder, means for controlling hydraulic fluid flow from the pump cylinder to the fluid pressure chamber, and high pressure relief means for providing for flow of hydraulic fluid from the pump cylinder to the reservoir when the hydraulic fluid pressure in the pump cylinder exceeds a predetermined hydraulic fluid pressure, the high pressure relief means including means responsive to the hydraulic fluid pressure in the pump cylinder for automatically causing hydraulic fluid in the pump cylinder to be vented to the reservoir whenever the hydraulic fluid pressure in the pump cylinder exceeds a selected maximum hydraulic fluid pressure, the cartridge body including a first cartridge passage having a first check valve means for selectively providing for fluid flow from the hydraulic fluid reservoir to the pump cylinder, said first check valve means including means for preventing fluid flow from the pump cylinder to the reservoir, a second cartridge passage having second check valve means for selectively providing for hydraulic fluid flow from the pump cylinder to said fluid pressure chamber but preventing fluid flow from said fluid pressure chamber to said pump cylinder, and a third cartridge passage including means for selectively venting hydraulic fluid in the pump cylinder to the reservoir when the hydraulic fluid pressure in the pump cylinder exceeds a maximum value while maintaining fluid pressure in the fluid pressure chamber.

8. A hydraulic fluid flow pump assembly as set forth in claim 7 wherein said means responsive to the hydraulic fluid pressure in the pump cylinder for automatically causing hydraulic fluid in the pump cylinder to be vented includes a valve seat in said third cartridge passage, a valve member engageable with said valve seat and movable away from said valve seat to permit fluid flow from said pump cylinder to said reservoir and spring means engageable with the valve means and resiliently biasing the valve means against the valve seat.

9. A hydraulic fluid pump assembly as set forth in claim 1 wherein said cartridge body comprises a cylindrical body having a generally cylindrical periphery and having a longitudinal axis, and wherein each of said cartridge passages has a longitudinal axis, and wherein the respective longitudinal axes of said cartridge passage are spaced apart with respect to one another and are generally parallel to said longitudinal axis of the cylindrical body.

10. A hydraulic fluid pump assembly as set forth in claim 9 and further including a transverse passage extending from said third cartridge passage to said generally cylindrical periphery, said transverse passage providing fluid communication between said third cartridge passage and the reservoir.

11. A hydraulic fluid pump assembly as set forth in claim 10 wherein said transverse passage intersects said first cartridge passage between said first check valve and the reservoir.

12. A hydraulic unit assembly comprising:

a ram cylinder, a ram housed in said ram cylinder, a hydraulic fluid reservoir, a hydraulic fluid pump including a pump base having a bore, a first fluid passage in the pump base and providing fluid communication between the hydraulic fluid reservoir and the bore in the pump base, a second fluid passage in the pump base and providing fluid communication between the bore in the pump base and the ram cylinder, a hydraulic fluid pump cylinder operably connected to the bore in the pump base, a pump piston housed in the pump cylinder and reciprocably movable to cause fluid to be pumped, and hydraulic fluid control cartridge means removably housed in the bore in the pump base, the hydraulic fluid control cartridge means including a cartridge body housed in the bore, the hydraulic fluid control cartridge means including means for controlling the flow of hydraulic fluid from the hydraulic fluid reservoir to the pump cylinder, means for controlling hydraulic fluid flow from the pump cylinder to the ram cylinder, and high pressure relief means for providing for flow of hydraulic fluid from the pump cylinder to the reservoir when the hydraulic fluid pressure in the pump cylinder exceeds a predetermined hydraulic fluid pressure, the high pressure relief means including means responsive to the hydraulic fluid pressure in the pump cylinder for automatically causing hydraulic fluid in the pump cylinder to be vented to the reservoir whenever the hydraulic fluid pressure in the pump cylinder exceeds a selected maximum hydraulic fluid pressure, the cartridge body including a first cartridge passage having a first check valve means for selectively providing for fluid flow from the hydraulic fluid reservoir to the pump cylinder, said first check valve means including means for preventing fluid flow from the pump cylinder to the reservoir, a second cartridge passage having a second check valve means for selectively providing for hydraulic fluid flow from the pump cylinder to said ram cylinder to the pump cylinder, and a third cartridge passage including means for selectively venting hydraulic fluid in the pump cylinder to the reservoir when the hydraulic fluid pressure in the pump cylinder exceeds a maximum value, while maintaining fluid pressure in the ram cylinder.

13. A hydraulic unit assembly as set forth in claim 12 wherein said means responsive to the hydraulic fluid pressure in the pump cylinder for automatically causing hydraulic fluid in the hydraulic fluid pump to be vented provides for venting of fluid pressure from the pump cylinder while maintaining fluid pressure in the ram cylinder.

14. A hydraulic unit assembly as set forth in claim 12 wherein said hydraulic fluid control cartridge means includes a cartridge including a first cartridge passage having a first check valve means for selectively providing for fluid flow from the hydraulic fluid reservoir to the pump cylinder, said first check valve means including means for preventing fluid flow from the pump cylinder to the reservoir, a second cartridge passage having second check valve means for selectively providing for hydraulic fluid flow from the pump cylinder to said ram cylinder but preventing fluid flow from said ram cylinder to the pump cylinder, and a third cartridge passage including means for selectively venting hydraulic fluid in the pump cylinder to the reservoir when the hydraulic fluid pressure in the pump cylinder exceeds a maximum value.

15. A hydraulic unit assembly as set forth in claim 12 wherein said means responsive to the hydraulic fluid pressure in the pump cylinder for automatically causing hydraulic fluid in the pump cylinder to be vented to the reservoir includes a valve seat in said third passage, a valve member engageable with said valve seat and movable away from said valve seat to permit fluid flow from said pump to said reservoir and spring means engageable with the valve means and resiliently biasing the valve means against the valve seat.

16. A hydraulic unit assembly as set forth in claim 12 wherein said cartridge comprises a cylindrical body having a generally cylindrical periphery and having a longitudinal axis, and wherein each of said cartridge passages has a longitudinal axis, an wherein the respective longitudinal axes of said cartridge passages are spaced apart with respect to one another and are generally parallel to said longitudinal axis of the cylindrical body.

17. A hydraulic unit assembly as set forth in claim 16 and further including a transverse passage extending from said third cartridge passage to said generally cylindrical periphery, said transverse passage providing fluid communication between said third cartridge passage and the reservoir.

18. A hydraulic unit assembly as set forth in claim 17 wherein said transverse passage intersects said first cartridge passage between said first check valve and the hydraulic fluid reservoir.

19. A portable hydraulic crane comprising a support structure, a boom supported by said support structure, the boom including a lifting end and an opposite end supported by the support structure such that the lifting end of the boom is vertically movable.

a hydraulic lift cylinder assembly having opposite ends, said hydraulic lift cylinder assembly including a telescoping piston and a lift cylinder, one of said piston and lift cylinder being connected to said boom and the other of said piston and lift cylinder being supported by said support structure, means for selectively supplying hydraulic fluid to said lift cylinder to cause extension of the piston and cylinder and upward movement of said lifting end of said boom, said means for selectively supplying hydraulic fluid to said lift cylinder including a reservoir containing hydraulic fluid, a hydraulic fluid pump operably connected by a first fluid passage to said reservoir and operably connected by a second fluid passage to said lift cylinder, said hydraulic fluid pump including a pump base having a bore, a pump cylinder connected to said bore, and a pump piston housed in said pump cylinder for reciprocal movement, means for selectively causing reciprocating movement of said pump piston in said pump cylinder, said pump piston being extensible with respect to said pump cylinder to draw hydraulic fluid into said pump cylinder and said pump piston being retractable in said pump cylinder to discharge hydraulic fluid from said pump cylinder, and a hydraulic fluid control cartridge removably housed in the bore in the pump base and being separable from the pump cylinder, said hydraulic fluid control cartridge including a cartridge body housed in the bore and further including means for controlling the flow of hydraulic fluid from said hydraulic fluid reservoir to said pump cylinder, means for controlling hydraulic fluid flow from said pump cylinder to said lift cylinder, and high pressure relief means for providing for flow of hydraulic fluid from said pump cylinder to said reservoir when the hydraulic fluid pressure in said pump cylinder exceeds a predetermined hydraulic fluid pressure, the high pressure relief means including means responsive to the hydraulic fluid pressure in the pump cylinder for automatically causing hydraulic fluid in the pump cylinder to be vented to the reservoir whenever the hydraulic fluid pressure in the pump cylinder exceeds a selected maximum hydraulic fluid pressure, said means for controlling hydraulic fluid flow from said hydraulic fluid reservoir to said pump cylinder including a first cartridge passage in said cartridge body, a first check valve in said first cartridge passage, said first cartridge passage communicating with said first fluid passage, and said first check valve preventing fluid flow from said pump cylinder to said hydraulic fluid reservoir, said means for controlling hydraulic fluid flow from said fluid pump to said lift cylinder including a second cartridge passage in said cartridge body and a second check valve in said second cartridge passage for preventing fluid flow from said lift cylinder to said fluid pump, and said high pressure relief means including a third cartridge passage in said cartridge body, said third cartridge passage communicating with said first cartridge passage, and said third cartridge passage including a valve seat, a ball selectively engageable with said valve seat, and spring means for forcing said ball into engagement with said valve seat, said spring means permitting said ball to move away from said valve seat when said hydraulic fluid pressure in said pump cylinder exceeds a selected maximum fluid pressure.

20. A portable hydraulic crane as set forth in claim 19 wherein said pump base includes said hydraulic fluid passage connecting said reservoir to said hydraulic fluid pump, and includes said hydraulic fluid passage from said pump to said hydraulic cylinder.

21. A portable hydraulic crane as set forth in claim 20 wherein said bore has opposite ends, one of said ends housing said pump cylinder, and an opposite end terminating in said passage between said pump and said lift cylinder, said hydraulic fluid control cartridge being housed in said bore between said opposite ends of said bore, and said passage from said hydraulic fluid reservoir to said pump intersecting said bore intermediate said opposite ends of said bore and adjacent said hydraulic cartridge.

22. A portable hydraulic crane as set forth in claim 19 wherein said cartridge body includes a longitudinal axis, wherein said cartridge passages are generally parallel to said longitudinal axis, and wherein said cartridge body further includes a radially extending passage from said third passage to said first fluid passage, said radially extending passage intersecting said first passage in said cartridge between said first check valve and said first fluid passage.

23. A portable hydraulic crane as set forth in claim 19 wherein said cartridge is cylindrical and includes opposite ends, one of said opposite ends including a periphery, and seal means between said periphery of said one of said opposite ends and said bore, and the other of said opposite ends including a periphery and seal means surrounding said other of said opposite ends.

* * * * *